(No Model.) 2 Sheets—Sheet 1.
J. THOMPSON.
APPARATUS FOR IRRIGATING PURPOSES.
No. 375,021. Patented Dec. 20, 1887.
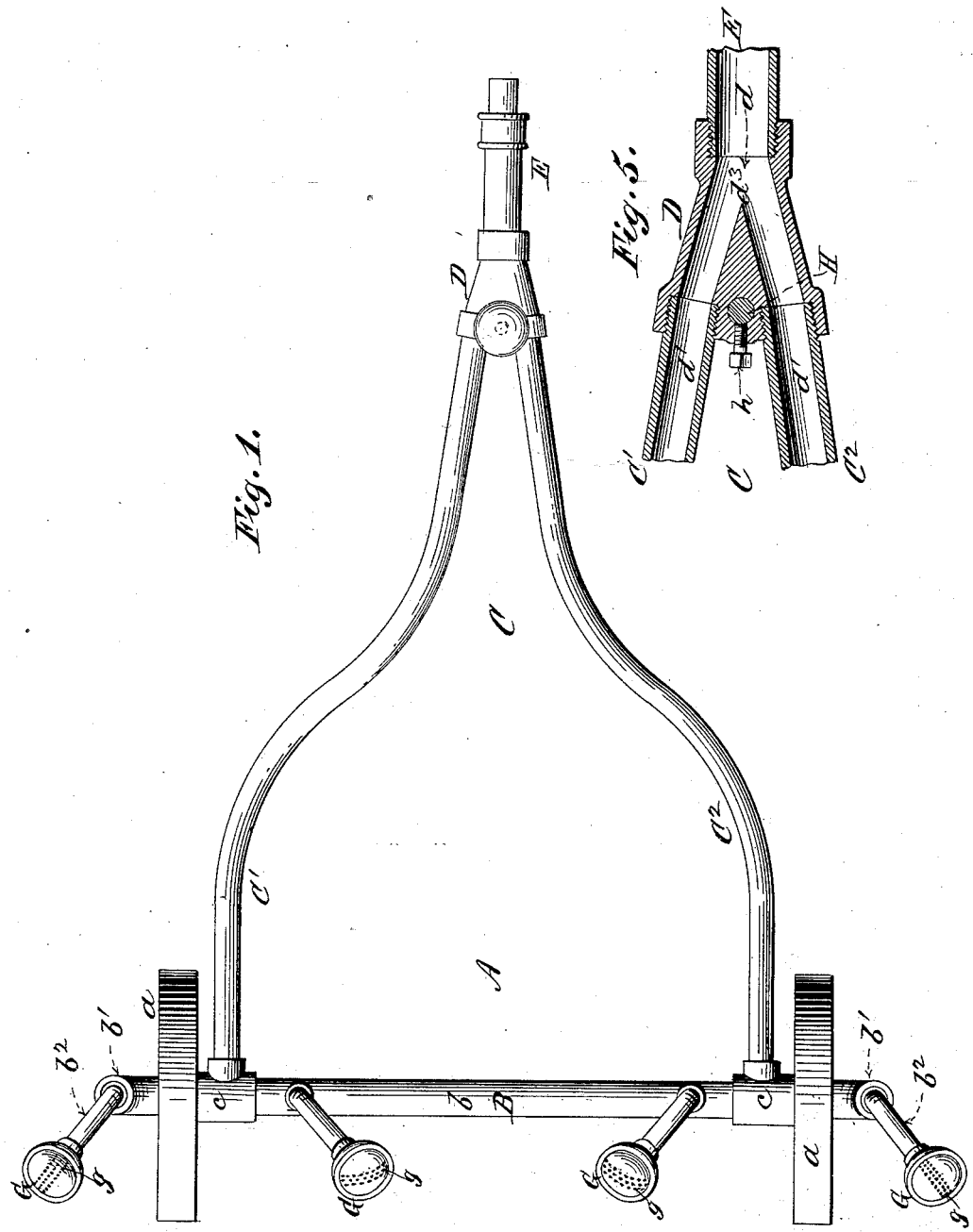
Witnesses:
Wm Gardner.
Wm. A. Pollock
Inventor:
John Thompson,
By his Attorney
Geo. H. Watt (No Model.) 2 Sheets—Sheet 2.
J. THOMPSON.
APPARATUS FOR IRRIGATING PURPOSES.
No. 375,021. Patented Dec. 20, 1887.
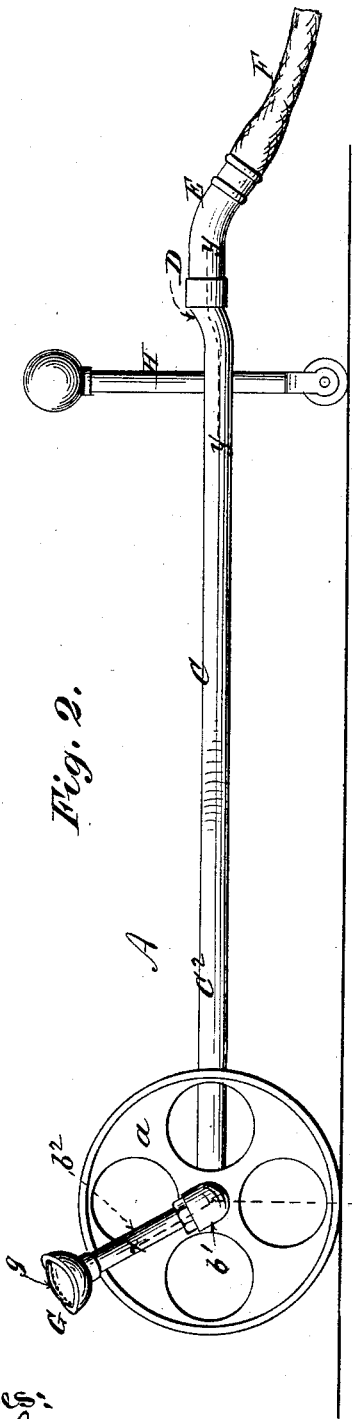
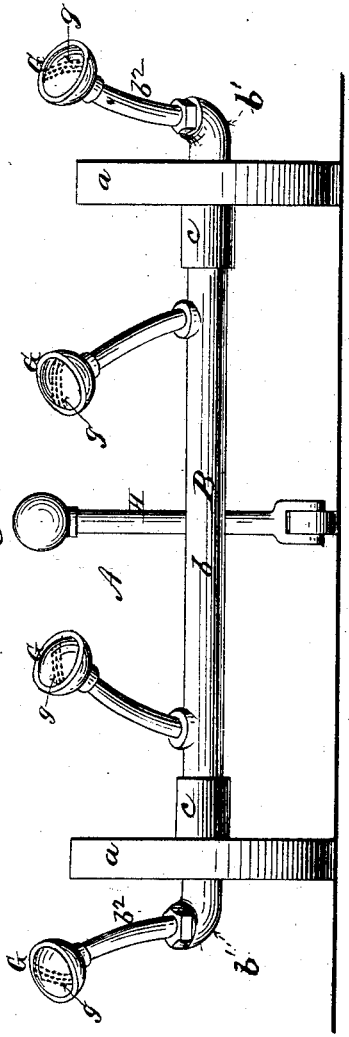
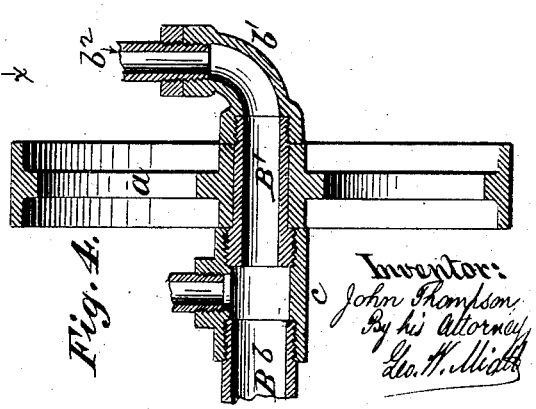

UNITED STATES PATENT OFFICE.

JOHN THOMPSON, OF BROOKLYN, NEW YORK.

APPARATUS FOR IRRIGATING PURPOSES.

SPECIFICATION forming part of Letters Patent No. 375,021, dated December 20, 1887.

Application filed September 13, 1886. Serial No. 213,409. (No model.)

*To all whom it may concern:*

Be it known that I, JOHN THOMPSON, a citizen of the United States, residing in the city of Brooklyn, in the county of Kings and State of New York, have invented certain new and useful Improvements in Apparatus for Irrigating Purposes, of which the following is a full, clear, and exact description sufficient to enable others to make and use the same.

There are positive and well-known objections to the old method of irrigating by means of permanently-situated distributing pipes or ditches—such, for instance, as unequal distribution, absorption, &c.—which it is the main object of my invention to obviate, and to substitute therefor, as nearly as can be attained by mechanical means, a natural and uniform distribution of water over a given area, and at the same time render the apparatus more simple and convenient in use than those heretofore known.

My improvements are adapted equally to the irrigation of large or small areas, for farm or for lawn or garden use, the difference between apparatus for such different purposes consisting only in the proportions of apparatus used and not in principle of construction.

I am aware that various forms of sprinklers for lawns have heretofore been known and used; but such devices are not the equivalent of my "portable" irrigator. The sprinklers referred to are not, strictly speaking, portable, since they are designed to be lifted bodily from one position to another, which cannot conveniently be done without first shutting off the supply of water; whereas my irrigator can be readily changed in position, or, if desired, kept continuously in motion without disturbing or interfering with the continuous distribution of the water or subjecting the operator to a wetting.

Although not absolutely essential to the distribution of water according to my invention, my device is preferably constructed and designed to simultaneously sprinkle all parts of a prescribed area which is practically rectangular in form, so that by moving the apparatus a distance equal to the width of such rectangular space an adjoining space of like shape and area may be irrigated without the omission of any intervening spaces or unnecessary overlapping of the spaces under treatment, as is unavoidably the case where the ordinary rotating circular sprinklers are used.

A feature of my invention consists in combining with a suitable distributing-chamber formed directly in and constituting the axle of the apparatus a rigid bifurcated truck-rod which distributes the liquid equally and simultaneously to the opposite ends of the said axial chamber, thereby rendering the supply and pressure at the several discharge-roses uniform and insuring an even distribution of liquid spray throughout a prescribed area. By thus constructing the apparatus with a comparatively large elongated receiving and distributing chamber of greater or less length, and by using in connection therewith a greater or less number of roses, as may be required, I can adapt the apparatus for use as an ordinary garden or lawn sprinkler with a "spread" of, say, twenty or twenty-five feet, or for park or farm purposes with a spread of, say, fifty feet, according to requirements and the available water-pressure, &c. When used for irrigating growing crops, &c., the diameter of the wheels to be used will be regulated with relation to the height of the plants over which the apparatus is designed to pass.

A special feature of my invention consists in the peculiar construction and combination, with the hollow truck-rods which communicate with the equalizing-chamber, of a bifurcated coupling-piece which receives the main supply of water and divides and delivers it equally to the said hollow truck-rods, so that each extremity of the equalizing-chamber is supplied under like conditions. The roses are inclined outward and forward, so as to throw the spray or shower in front of the apparatus.

Provision is made for the permanent adjustment of the inclination of the roses by forming the extremities of the pipe of which the equalizing-chamber is composed respectively with right and left screw-threads, which engage suitable female screw-threads formed in the T pieces or couplings upon the lower ends of the hollow truck-rods.

Since the central rose-pipes project radially from the equalizing-chamber it is obvious that any rotation of that cylinder upon its longitudinal axis will alter the angle or inclination formed between them and the said truck-rods, and hence govern the angle at which the spray will be discharged. In like manner the end roses are varied in inclination by rotating the elbows from which they project upon the screw-threads formed upon the outer ends of the hollow axles. The other or temporary means for varying the inclination of the roses during the operation of the apparatus consists in the use of a device, substantially such as herein shown, for prescribing the position and inclination of the hollow truck-rods, couplings, &c., when at rest. An adjustable rod attached at or near the inner end of the hollow frame or handle affords a convenient means for thus regulating the horizontal projection of the spread, according to the special requirements of the area under immediate treatment.

Another feature of my invention consists in forming the roses with series of parallel discharge-holes and in arranging the inner roses with their rows of discharge-holes extending horizontally, or nearly so, so as to discharge diagonally each across the spray or spread of the other, while the parallel rows of discharge-holes in the end rose are arranged vertically and discharge their spray outward and in front of the wheels. By this means I attain an equitable and uniform shower of spray over an area that is practically a rectangular parallelogram, and am therefore enabled to perfectly irrigate succeeding sections of a prescribed width by simply causing the truck to recede from time to time in a straight line, as hereinbefore indicated.

The retractile movement of the truck may be effected from a considerable distance by means of the hose which conveys the water to the apparatus, thus obviating any direct handling or attention after the apparatus has been first set at the further extremity of the section of land to be irrigated.

Another advantage of my form of truck apparatus over others heretofore known is that it adapts itself readily to all inequalities or irregularities of surface without interference or alteration in the character of the spread discharged; whereas the old form of sprinklers not only have to be shut off and lifted bodily from place to place, but if they are not set accurately in a vertical position the rotation of the spraying device is either materially retarded or prevented altogether.

I herein show and describe practicable means for giving effect to my invention; but it is to be understood that I do not confine myself strictly to the specific form and construction shown, since it is obvious that various modifications may be substituted for some of the parts without deviating from the spirit of my invention.

In the accompanying drawings, Figure 1 is a plan of my improved irrigating apparatus; Fig. 2, a side elevation, and Fig. 3 a front elevation, of the same; Fig. 4, a section through one of the wheels and adjoining parts, taken upon plane of line $x\,x$, Fig. 2. Fig. 5 is a longitudinal section upon plane of line $y\,y$, Fig. 2.

The truck A is formed, generally, of the two wheels $a\,a$, the axle B, and the bifurcated truck-handle C. The axle B is hollow, and may consist of one or more pieces or sections of pipe. As shown in the drawings, the opposite ends of the central section, $b$, are formed with male screw-threads, which are respectively right and left handed. These threaded ends engage female screw-threads formed in the T-shaped coupling-pieces $c\,c$, attached to the outer ends of the truck-rods $C'\,C^2$. Smaller sections, B', of pipe screw in like manner into the outer ends of the T-couplings $c\,c$ and constitute the journals for the wheels $a\,a$. The outer ends of these journal-pieces B' are threaded, and project sufficiently beyond the wheels $a\,a$ to afford a means of attachment for the elbows $b'\,b'$, into which the lower ends of the outer rose-pipes, $b^2\,b^2$, are screwed.

The truck-rods $C'\,C^2$ are preferably made of hollow pipes bent so as to approach each other at the rear, where they are connected together by the bifurcated coupling-piece and jet-divider D. The jet-divider D is formed with the large central water-passage, $d$, which connects with the inlet or supply pipe, and with the smaller passages $d'\,d'$, which communicate with the passages in the hollow truck-rods $C'\,C^2$. The thickness or division-piece between the bifurcated passages $d'\,d'$ terminates in a sharp edge, $d^3$, which is diametrically opposite the center of the larger inlet-passage, $d$, so that the water emerging from the latter is accurately divided and deviated into the passages $d'\,d'$, from which it passes in equal volumes through the hollow truck-rods to the equalizing-chamber B.

I am aware that Y-joints for pipes have heretofore been known for conducting two converging streams into a common outlet or discharge pipe, and I do not seek to cover herein, broadly, a Y-shaped or bifurcated coupling; but I am not aware that a dividing and deviating coupling has heretofore been used for the purpose of accurately and evenly distributing a stream of water from a main or supply pipe to the opposite ends of an equalizing-chamber, as herein shown and described, and I therefore seek to cover such combination of parts broadly.

The section of the main supply-pipe E to which the outer end of the hose F is directly attached is preferably bent downward, as shown in Fig. 2, for the purpose of preventing any sharp and injurious angle in the said hose. Thus bent and in conjunction with the jet-divider D, it forms a convenient handle by which to grasp and move the apparatus.

The roses G are each formed with a series of small discharge holes or perforations, $g$, which are arranged in parallel rows. The roses G are secured to the outer ends of the rose-pipes $b^2\,b^2$, which communicate with the equalizing-chamber B, projecting radially therefrom and being inclined with relation thereto, so as to throw the spray in front of and beyond the apparatus.

It is obvious that any desired or convenient construction or arrangement of rose may be used in conjunction with my apparatus; but I prefer to use my special form with the rows of parallel holes and to arrange them as indicated in Figs. 1 and 3—that is to say, I incline the outer or end roses outward with their rows of perforations in a vertical position, while the inner roses are inclined toward each other with their rows of perforations in a horizontal or nearly horizontal position. This arrangement I have found by actual experience to be the best in securing an even and uniform distribution of water throughout a rectangular area, as hereinbefore mentioned. The inclination of the inner roses is "set" or altered by turning the pipe B in the proper direction upon its longitudinal axis, while a like result is attained for the end roses by turning the elbows upon the ends of the journals.

An adjustable rest for the inner end of the truck-handle is provided, which also affects the inclination of the roses during use. This device may consist of obvious and well-known means for effecting the object—the plain rod shown in the drawings being simply by way of illustration—the essential feature that I seek to cover in this connection being an adjustable rest for the inner end of the truck, by which the inclination of the whole frame-work upon the wheels may be regulated.

In the drawings the upright rod H passes through a perforation formed in the jet-divider D between the diverging passages $d'$ $d'$, and is held rigidly in the desired position by a binding or set screw, $h$.

The lower end of the rod H may be provided with a roller to facilitate the movement of the truck when it is desired to retract through the medium of supply-hose without approaching or raising it.

The upper portion of the rod H, in conjunction with the two inner rose-pipes, $b^2$ $b^2$, is also useful in holding and supporting the hose upon the frame when not in use, the said hose being passed in turn around the rose-pipes and rod H, in which position it is sustained underneath by the pipe B and the truck-rods C' C'.

What I claim as my invention, and desire to secure by Letters Patent, is—

1. In an irrigating apparatus, the combination of a distributing-chamber, B, forming a hollow axle for the supporting-wheels, radial sprinklers projecting from the said distributing-axle at different points in its length, and a bifurcated pipe, C, forming the handle of the apparatus and connected with the distributing-axle at points near the ends thereof, and adapted to serve as the inlet-pipe for the water to be distributed, substantially as and for the purpose herein specified.

2. In an irrigating apparatus substantially such as described, the combination, with the diverging hollow truck-rods C' C², axial equalizing and distributing chamber B, and its series of radial discharge-roses communicating directly therewith, of the bifurcated jet-divider and coupler D, interposed between and connecting the inner ends of the said diverging hollow truck-rods C' C² and the water-supply pipe, substantially in the manner and for the purpose described.

3. The combination of the hollow distributing-axle provided with radial distributing pipes and roses, the couplings $c$ $c$, screwed upon the ends of the axle, bifurcated handle-pipes C' C², opening into the said couplings, journal-pieces B' B', screwed into the couplings, elbow-pieces $b'$ $b'$, screwed to the journal-pieces, and the outer discharge-pipes, $b^2$ $b^2$, screwed to the elbow-pieces, substantially as and for the purpose herein specified.

4. In combination with an irrigating apparatus substantially such as described, the special construction and arrangement of the distributing-roses herein set forth, consisting of the central roses arranged with their parallel lines of discharging-holes in a horizontal or substantially horizontal plane and inclined toward each other, and of the outer or end roses arranged with their parallel lines of discharge-holes in a vertical or nearly vertical plane, for the purpose and substantially in the manner described.

JOHN THOMPSON.

Witnesses:
GEO. W. MIATT,
WM. GARDNER.